United States Patent
Foster et al.

(10) Patent No.: US 6,923,532 B2
(45) Date of Patent: Aug. 2, 2005

(54) EFFICIENT YELLOW THERMAL IMAGING RIBBON

(75) Inventors: David G. Foster, West Henrietta, NY (US); Maurice L. Gray, Rochester, NY (US); Cobb S. Goff, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 25 days.

(21) Appl. No.: 10/371,021

(22) Filed: Feb. 20, 2003

(65) Prior Publication Data

US 2004/0166254 A1 Aug. 26, 2004

(51) Int. Cl.[7] .................................................. B41J 2/01
(52) U.S. Cl. ....................... 347/101; 347/193; 428/32.6
(58) Field of Search ............................. 347/105, 101, 347/100, 191, 193, 211, 103; 428/195, 32.1, 32.6; 503/227; 430/200

(56) References Cited

U.S. PATENT DOCUMENTS

| | | | |
|---|---|---|---|
| 4,621,271 A | | 11/1986 | Brownstein .................. 347/211 |
| 5,830,824 A | * | 11/1998 | Lum et al. ................ 428/195.1 |
| 5,891,602 A | * | 4/1999 | Neumann .................... 430/200 |
| 5,932,519 A | * | 8/1999 | Landry-Coltrain et al. . 428/913 |
| 6,211,894 B1 | * | 4/2001 | Yamaya et al. ............. 347/193 |
| 6,365,547 B1 | * | 4/2002 | Foster et al. ................ 428/195 |

\* cited by examiner

Primary Examiner—Manish Shah
(74) Attorney, Agent, or Firm—Paul A. Leipold

(57) ABSTRACT

The invention relates to a donor for thermal imaging including a base and dye layer, wherein said dye layer includes yellow dye and binder in a ratio of about 0.63, and said base has a thickness of between 4 to 4.75 micrometers.

16 Claims, 1 Drawing Sheet

EFFICIENT YELLOW THERMAL IMAGING RIBBON

FIELD OF THE INVENTION

This invention relates to a dye-donor element for thermal dye transfer, and more particularly to a more efficient yellow donor ribbon used for such elements in a multi-head thermal printer system resulting in less printing artifacts, less cooling requirements to sustain printing for longer times, and the ability to better operate in higher temperature environments.

BACKGROUND OF THE INVENTION

In recent years, thermal transfer systems have been developed to obtain printed output from images generated from various electronic capturing devices and methods. An electronic image is first subjected to color separation by color filters. The respective color separated images are then converted into electrical signals. These signals are then operated on to produce cyan, magenta and yellow electrical signals. These signals are then transmitted to a thermal printer. To obtain the print, a cyan, magenta or yellow dye-donor element is placed face-to-face with a dye-receiving element. The donor element and dye receiving element are then inserted between a thermal printing head and a platen roller. A line-type thermal printing head is used to apply heat from the back of the dye-donor sheet. The thermal printing head has many heating elements and is heated up sequentially in response to the cyan, magenta and yellow signals. The process is then repeated for the other two colors. The dye is transferred from these selectively heated regions of the dye donor sheet to the receiver sheet to form a pattern with a shape and intensity that corresponds to the pattern and intensity of the heat applied to the dye donor element. A color hard copy is thus obtained which corresponds to the original picture viewed on a screen. Further details of this process and an apparatus for carrying it out are contained in U.S. Pat. No. 4,621,271 by Brownstein entitled "Apparatus and Method for Controlling a Thermal Printer Apparatus," issued Nov. 4, 1986, the disclosure of which is hereby incorporated by reference.

The thermal print-head contains a very hot print element that is in intimate contact with a dye donor ribbon. The current donor ribbon is designed to contain a heat resistant or slipping layer on one side to facilitate movement of the donor element across the print head. The opposite side is comprised of cyan, magenta and yellow dye and laminate that are patch coated on the opposite side of the support that is typically polyethylene terephthalate (PET).

The purpose of the slipping layer is to facilitate printing by providing a surface that can survive contact with the hot print head and is also lubricious enough to allow movement across the head.

The dye side of the patch coated donor ribbon contains alternating patches of cyan dye, magenta dye, yellow dye, and laminate that are printed in succession. Because few materials stick to PET, it is necessary to have an adhesive layer in between the slip and PET, as well as in between the PET and dye layers.

As the print is made, the receiver which is a dye receiving layer coated on paper support, moves through the printer, it receives the yellow dye, backs up, receives the magenta dye, backs up, receives the cyan dye, backs up, and lastly receives the protective laminate layer. The receiver is traditionally fed through the printer in sheet format. Print time for an 8×10 inch print is approximately 90 seconds with this method.

As the system evolves into higher volume applications, a multi-head printing system is necessary to allow faster printing times. When media was designed for the multihead printer, problems were found that were different from what were found with the cyan, magenta or laminate design. At the desired printing speed the thermal efficiency was not achieved with the yellow dye donor. Artifacts in the yellow dye donor were found, and higher printing energies were necessary to obtain the necessary maximum density to create acceptable photographic images.

PROBLEM TO BE SOLVED

There remains a need for a yellow dye donor that will accurately transfer at faster printing times in a multihead printer, with high efficiency of thermal transfer and and no printing artifacts such as folds and creases in the donor while achieving good density characteristics.

SUMMARY OF THE INVENTION

It is an object of the present invention to provide a yellow dye donor format and formulation that is compatible with the multi-head printing system.

It is another object to provide an optimized yellow dye donor element that incorporates a thin support for improved thermal efficiency.

It is a further object to provide a yellow dye donor element that has an optimized dye to binder ratio to facilitate thermal printing in a multi-head printer system that requires lower energy to print.

These and other objects of the invention are accomplished by a donor for thermal imaging comprising a base and dye layer, wherein said dye layer comprises yellow dye and binder in a ratio of 0.6 to 0.7, and said base has a thickness of between 3 and 5 micrometers.

ADVANTAGEOUS EFFECT OF THE INVENTION

The invention provides an efficient optimized yellow dye donor element for the multi-head printer architecture that provides less printing artifacts, less cooling requirements to sustain printing for longer times, the ability to better operate in higher temperature environments and the ability to create photographic images without increasing energy when printing the yellow ribbon.

DETAILED DESCRIPTION OF THE INVENTION

Figure 1:
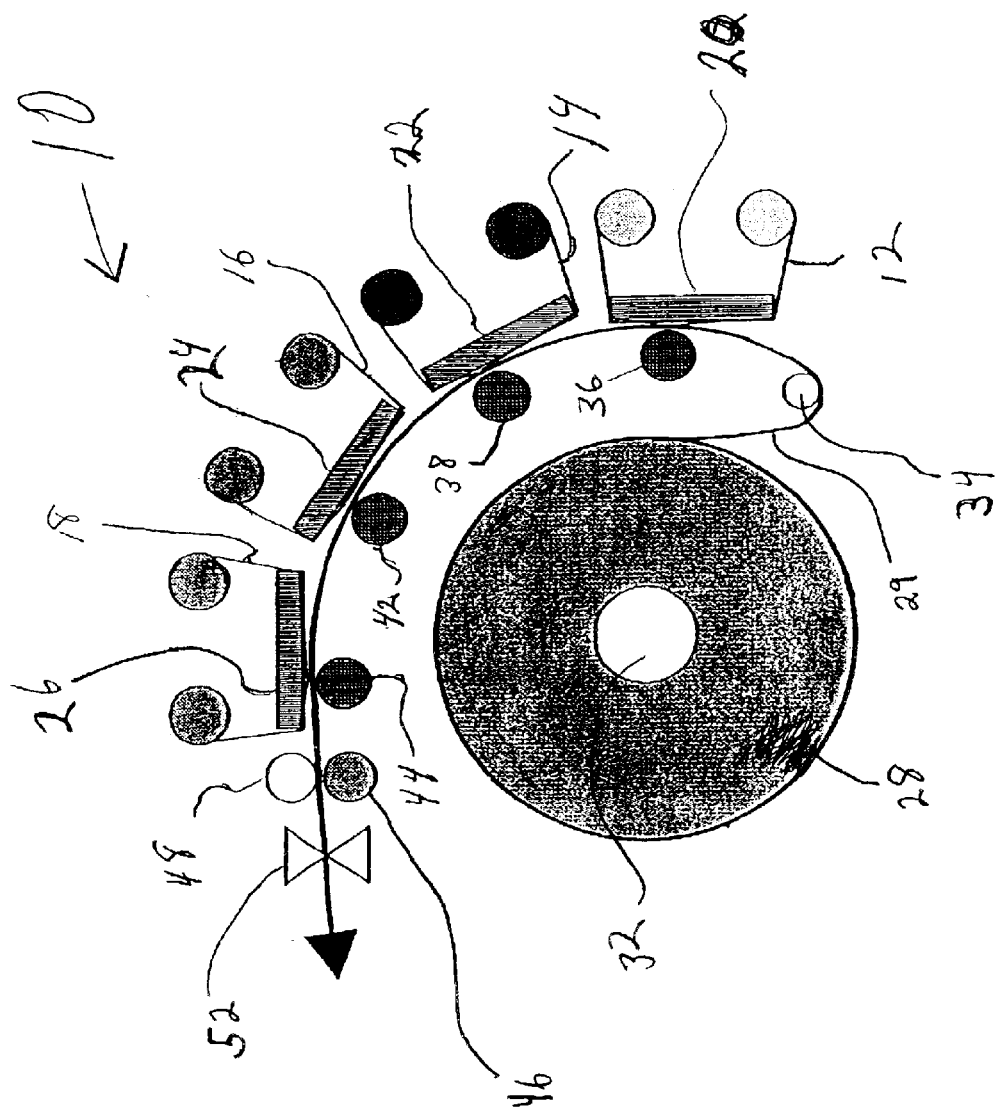
FIG. 1. Is a schematic illustration of a multihead printer.

The invention has numerous advantages by facilitating printing with significantly fewer printing artifacts, less cooling requirements to sustain printing for longer times, and the ability to better operate in higher temperature environments, to provide a 10% increase in printer speed, resulting in less printing artifacts, less cooling requirements to sustain printing for longer times, and the ability to better operate in higher temperature environments. These and other advantages will be apparent from the detailed description below.

FIG. 1 depicts a multihead printer configuration. In the figure, the printer (10), has yellow (12), magenta (14), cyan (16) and laminate (18) donor ribbons. Each donor ribbon has an associated print head, a print head for the yellow donor (20), a print head for the magenta donor (22), a print head for the cyan donor (24) and a print head for the laminate (26). The roll of receiver (28) is unwound and moves on its associated path as the receiver (29) moves through the printer (10). The roll fed receiver (28) as it is removed from core (32) passes over curl reversing roller (34). The receiver (28) then passes over donor tracking roller (36) at the yellow image print head, then between print head (22) and tracking roller (38). The receiver with yellow and magenta colorants then passes between cyan print head and tracking roller (42) prior to passing between laminate print head (26) and tracking roller (44). The receiver (28) is driven by drive roll (46) that is opposite pinch roll (48). The receiver (28) with an image then passes through cutter (52) where it is cut into prints of useful size.

In use, yellow, magenta and cyan dyes are thermally transferred from a dye-donor element to form an image on the dye-receiving sheet. The thermal head is then used to transfer the clear protection layer, from another clear patch on the dye-donor element or from a separate donor element, onto the imaged receiving sheet by uniform application of heat. The clear protection layer adheres to the print and is released from the donor support in the area where heat is applied.

As has been set forth above there is a need for yellow dye donor elements that are capable of performance at high rates of productivity with efficient transfer and good image formation. In order to accomplish this it has been found that close control of the composition of the dye donor layer and the base material will allow efficient transfer at higher speeds. It has been found that by controlling the ratio of yellow dye and binder ratio to between 0.6 and 0.7 the transfer results are improved. Further, it has been found that the thickness of the base below the dye transfer layer also is important in effective transfer at higher speeds. It has been found that a polyethyleneterephthalate polymer base is preferred as it is stable during heating and strong. A preferred thickness has been found to be between 4 and 4.75 micrometers for efficient heat transfer and sufficient strength to prevent folds and creases in the donor sheet during feeding and printing for image transfer.

It has been found that for preferred performance the dye weight in the dye donor layer of the donor sheet preferably has a coverage of between 0.05 to about 1 $g/m^3$. This is preferred as it provides sufficient dye for good density in the image formed. The glass transition temperature of the donor layer is suitably between 25 and 60° C.

In order to obtain good yellow images in the image formation it has also been found that when utilizing the preferred yellow donor sheet of the invention, that the print head be heated using a power range of less than 0.066 watts per dot. A preferred power range has been found to use a power range of 0.057 and 0.063 watts per dot for best density of yellow dye transfer at higher speeds. The yellow dye donor of the invention has been found to be satisfactorily operated at speeds of greater than 1.1 meters per minute.

Any dye can be used in the dye layer of the dye-donor elements provided it is transferable to the dye-receiving layer by the action of heat. Especially good results have been obtained with sublimable dyes. Examples of sublimable dyes include anthraquinone dyes, e.g., Sumikaron Violet RS® (Sumitomo Chemical Co., Ltd.), Dianix Fast Violet 3R FS® (Mitsubishi Chemical Industries, Ltd.), and Kayalon Polyol Brilliant Blue N BGM® and KST Black 146® (Nippon Kayaku Co., Ltd.); azo dyes such as Kayalon Polyol Brilliant Blue BM®, Kayalon Polyol Dark Blue 2BM®, and KST Black KR® (Nippon Kayaku Co., Ltd.), Sumikaron Diazo Black 5G® (Sumitomo Chemical Co., Ltd.), and Miktazol Black 5 GH® (Mitsui Toatsu Chemicals, Inc.); direct dyes such as Direct Dark Green B® (Mitsubishi Chemical Industries, Ltd.) and Direct Brown M® and Direct Fast Black D® (Nippon Kayaku Co. Ltd.); acid dyes such as Kayanol Milling Cyanine 5R® (Nippon Kayaku Co. Ltd.); basic dyes such as Sumiacryl Blue 6G® (Sumitomo Chemical Co., Ltd.), and Aizen Malachite Green® (Hodogaya Chemical Co., Ltd.);

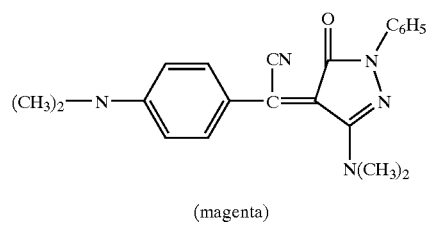

(magenta)

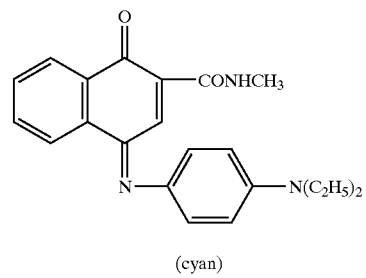

(cyan)

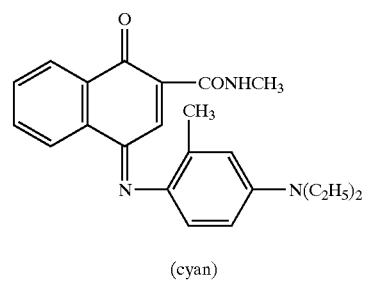

(cyan)

The dyes disclosed in U.S. Pat. No. 4,541,830, may also be utilized. The above dyes may be employed singly or in combination to obtain a monochrome. The dyes may be used at a coverage of from about 0.05 to about 1 $g/m^2$ and are preferably hydrophobic.

Any suitable yellow dye may be utilized in the invention. The preferred embodiment the yellow dyes are:

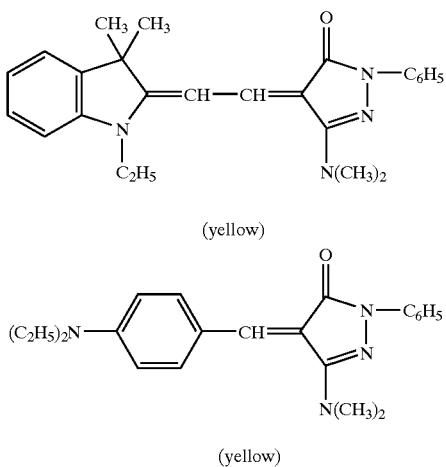

(yellow)

(yellow)

because these dyes have been shown to give the best color reproduction, raw stock keeping and transfer efficiency.

The yellow dyes are in the donor layer as well as the cyan and magenta dyes in their respective donor layers are in a binder material. The binder material may be any suitable material that will transfer when heat is applied to the donor element. The binder material also should be coatable, compatible with the receiver, compatible with the dyes for keeping without fade, and stable in the thermal printing environment. Suitable materials are polyvinyl acetal, cellulose acetate hydrogen phthalate, cellulose acetate propionate, cellulose acetate butyrate, and cellulose triacetate. A preferred material for utilization of the yellow layer of the invention is cellulose acetate propionate as this material provides good keeping properties and exceptional transfer properties.

The dye layers and protection layer of the dye-donor element may be coated on the support or printed thereon by a printing technique such as a gravure process.

A slipping layer may be used on the back side of the dye-donor element of the invention to prevent the printing head from sticking to the dye-donor element. This slipping layer does not contain transferable dye. Such a slipping layer would comprise either a solid or liquid lubricating material or mixtures thereof, with or without a polymeric binder or a surface-active agent. Suitable lubricating materials include oils or semi-crystalline organic solids that melt below 100° C. such as poly(vinyl stearate), beeswax, perfluorinated alkyl ester polyethers, poly-caprolactone, silicone oil, poly(tetrafluoroethylene), carbowax, poly(ethylene glycols), or any of those materials disclosed in U.S. Pat. Nos. 4,717,711; 4,717,712; 4,737,485; and 4,738,950. Perferred lubricating materials are polymethylsiloxanes. Preferred polymeric binders for the slipping layer include poly(vinyl alcohol-co-butyral), poly(vinyl alcohol-co-acetal), polystyrene, poly(vinyl acetate), cellulose acetate butyrate, cellulose acetate propionate, cellulose acetate or ethyl cellulose.

The amount of the lubricating material to be used in the slipping layer depends largely on the type of lubricating material, but is generally in the range of about 0.001 to about 2 g/m$^2$. If a polymeric binder is employed, the lubricating material is present in the range of 0.05 to 50 weight %, preferably 0.5 to 40 weight %, of the polymeric binder employed.

Any material can be used as the support for the dye-donor element of the invention provided it is dimensionally stable and can withstand the heat of the thermal printing heads. Such materials include polyesters such as poly(ethylene terephthalate); polyamides; polycarbonates; glassine paper; condenser paper; cellulose esters such as cellulose acetate; fluorine polymers such as poly(vinylidene fluoride) or poly(tetrafluoroethylene-co-hexafluoropropylene); polyethers such as polyoxymethylene; polyacetals; polyolefins such as polystyrene, polyethylene, polypropylene or methylpentene polymers; and polyimides such as polyimide amides and polyetherimides. The preferred support for this application is poly(ethylene terephthalate). The support generally has a thickness of from about 2 to about 30 μm. The yellow donor element of the invention preferably has a support thickness of between 3 and 6 micrometers. A most preferred thickness of the base of the yellow donor is between 4 and 4.75 micrometers for efficient transfer of the yellow dye layer while maintaining the dimensional stability of the base.

The dye-receiving element that is used with the dye-donor element of the invention usually comprises a support having thereon a dye image receiving layer. The support may be a transparent film such as a poly(ether sulfone), a polyimide, a cellulose ester such as cellulose acetate, a poly(vinyl alcohol-co-acetal) or a poly(ethylene terephthalate). The support for the dye-receiving element may also be reflective such as baryta-coated paper, polyethylene-coated paper, white polyester (polyester with white pigment incorporated therein), an ivory paper, a condenser paper or a synthetic paper such as DuPont Tyvek®.

The dye image-receiving layer may comprise, for example, a polycarbonate, a polyurethane, a polyester, poly(vinyl chloride), poly(styrene-co-acrylonitrile), polycaprolactone or mixtures thereof. The dye image-receiving layer may be present in any amount which is effective for the intended purpose. In general, good results have been obtained at a concentration of from about 1 to about 5 g/m$^2$.

As noted above, the yellow dye donor elements of the invention are used to form a dye transfer image in combination with cyan and magenta dye donors. Such a process comprises imagewise heating a dye-donor elements as described above and transferring a dye image to a dye receiving element to form the dye transfer image. After all the dye images are transferred, the protection layer is then transferred on top of the dye image.

The dye donor element of the invention may be used in sheet form or in a continuous roll or ribbon. If a continuous roll or ribbon is employed, it may have only one dye or may have alternating areas of other different dyes, such as sublimable cyan and/or magenta and/or yellow and/or black or other dyes. Such dyes are disclosed in U.S. Pat. Nos. 4,541,830; 4,698,651; 4,695,287; 4,701,439; 4,757,046; 4,743,582; 4,769,360 and 4,753,922, the disclosures of which are hereby incorporated by reference. Thus, one-, two-, three- or four-color elements (or higher numbers also) utilizing the yellow dye layer of the invention are included within the scope of the invention.

In a preferred embodiment of the invention, the dye-donor element comprises a poly(ethylene terephthalate) support coated with a continuous dye layer and the protection layer noted above. As a result, there is a yellow ribbon, a cyan ribbon, a magenta ribbon and an optional laminate ribbon. When the process is only performed for a single color, then a monochrome dye transfer image is obtained.

Thermal printing heads which can be used to transfer dye from the dye-donor elements of the invention are available commercially. There can be employed, for example, a Fujitsu Thermal Head FTP-040 MCSOO1, a TDK Thermal Head LV5416 or a Rohm Thermal Head KE 2008-F3.

A thermal dye transfer assemblage utilizing the invention comprises (a) a yellow dye-donor element as described above, and (b) a dye-receiving element as described above, the dye receiving element being in a superposed relationship with the dye donor element so that the dye layer of the donor element is in contact with the dye image-receiving layer of the receiving element.

The above assemblage comprising these two elements may be preassembled as an integral unit when a monochrome image is to be obtained. This may be done by temporarily adhering the two elements together at their margins. After transfer, the dye-receiving element is then peeled apart to reveal the dye transfer image.

When a three-color image is to be obtained, the above assemblage is formed on three occasions during the time when heat is applied by the thermal printing head. After the first dye is transferred, the elements are peeled apart. A second dye-donor element (or another area of the donor element with a different dye area) is then brought in register with the dye-receiving element and the process is repeated. The third color is obtained in the same manner. Finally, the protection layer is applied on top.

A transferable protection layer may be applied that comprises microspheres dispersed in a polymeric binder which also contains inorganic particles. Many such polymeric binders have been previously disclosed for use in protection layers. Examples of such binders include those materials disclosed in U.S. Pat. No. 5,332,713, the disclosure of which is hereby incorporated by reference. In a preferred embodiment of the invention, poly(vinyl acetal) is employed.

The inorganic particles useful in the protection layer of the donor element may be, for example, silica, titania, alumina, antimony oxide, clays, calcium carbonate, talc, etc. as disclosed in U.S. Pat. No. 5,387,573. In a preferred embodiment of the invention, the inorganic particles are silica. The inorganic particles improve the separation of the laminated part of the protection layer from the unlaminated part upon printing.

The protection layer contains from about 5% to about 60% by weight inorganic particles, from about 25% to about 60% by weight polymeric binder and from about 5% to about 60% by weight of the unexpanded synthetic thermoplastic polymeric microspheres.

The following example illustrates the practice of this invention. They are not intended to be exhaustive of all possible variations of the invention. Parts and percentages are by weight unless otherwise indicated.

EXAMPLE

Wrinkles in the donor cause poor printing results because a wrinkled donor is not contacting the receiving sheet properly causing incorrect amounts of dye transfer and unacceptable prints. As a result, the elimination of wrinkles is important to create acceptable photographic quality images.

An experiment was conducted to examine the difference between a donor originally designed for the multihead printer system and a donor ribbon using the new formulation. The total dye in the invention yellow donor was 17% greater than the total dye in the comparison yellow donor. The dye to binder ratios were 0.56 and 0.67 respectively in the comparison and invention yellow donors with the same coverage of binder (cellulose acetate propionate) in both. The formulations are included below in Table 1. Solvents for both yellow donors were toluene, methanol and cyclopentanone.

TABLE 1

Comparison and Invention Yellow Dye Donor Formulations.

| Component | Original Comparison Yellow Donor | Yellow Donor of the Invention |
| --- | --- | --- |
| Yellow Dye #1 (mgs/sqft) | 5.67 | 6.65 |
| Yellow Dye #2 (mgs/sqft) | 7.05 | 8.264 |
| cellulose acetate propionate (mgs/sqft) | 22.36 | 22.36 |
| Polyester sebacate (mgs/sqft) | 4.09 | 4.09 |
| Divinyl benzene beads, 2 micron (mgs/sqft) | 0.32 | 0.32 |

Table 2 contains the experimental results. The yellow donors were subjected to sufficient power to give a desired blue D-max density. Examining the D-max readings, it is seen that the yellow ribbon of the invention succeeded in achieving higher D-max without wrinkles than the comparison donor achieves. The comparison ribbon achieved a maximum blue density of 2.23 with unacceptable wrinkles only after being subjected to the highest power used in this experiment. Conversely, the invention ribbon achieved higher D-max at all levels of power, and was able to achieve the aim blue D-max well below the power where unacceptable wrinkles would be observed. As a result, a lower power can be used, resulting in the elimination of wrinkles, while still achieving the necessary D-max density to create photographic quality images.

TABLE 2

Results for Blue D-max Readings and Wrinkle Formation

| Yellow Ribbon Type | Volt | Power | Blue Dmax | Wrinkles |
| --- | --- | --- | --- | --- |
| comparison | 15.2 | 0.0646 | 2.21 | none |
| comparison | 15.4 | 0.0663 | 2.23 | unacceptable |
| invention | 14.7 | 0.0601 | 2.24 | none |
| invention | 15.0 | 0.0629 | 2.33 | none |
| invention | 15.2 | 0.0646 | 2.37 | none |

The invention has been described in detail with particular reference to certain preferred embodiments thereof, but it will be understood that variations and modifications can be effected within the spirit and scope of the invention.

What is claimed is:

1. A donor for thermal imaging comprising a base and dye layer, wherein said dye layer comprises yellow dye and binder in a ratio of about 0.63, and said base has a thickness of between 4 and 4.75 micrometers.

2. The donor of claim 1 wherein said base comprises polyethyleneterephthalate.

3. The donor of claim 2 wherein said dye layer has a coverage of between 0.05 to about 1 g/m$^2$.

4. The donor of claim 1 wherein said dye comprises a combination of the two yellow dyes:

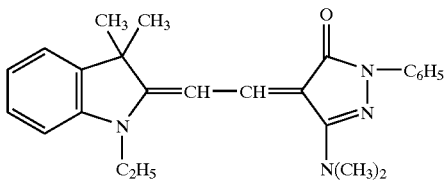

(yellow)

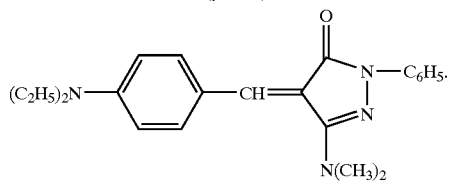

(yellow)

5. The door of claim 1 wherein said binder comprises cellulose acetate propionate.

6. The donor of claim 1 wherein said dye layer has a glass transition temperature of between 25 and 60° C.

7. The donor of claim 1 wherein said donor further comprises a siloxane slip layer on the side of the base opposite to said dye layer.

8. The donor of claim 1 wherein said dye layer has a coverage of between 0.05 to about 1 g/m².

9. A method of forming an image comprising providing a donor for thermal imaging comprising base and yellow dye layer, wherein said dye layer comprises yellow dye and binder in a ratio of 0.63, and said base has a thickness of between 4 and 4.75 micrometers, passing said donor beneath a heated printhead, and transferring at least a portion of said yellow dye layer to a receiver sheet wherein said printhead is heated using a power range of 0.057 to 0.063 watts per dot, and wherein said passing of said donor beneath said heated printhead is at a speed of greater than 1.10 meters per minute.

10. The method of claim 9, wherein said receiver sheet after transfer of said yellow dye is passed under at least one more printhead to transfer a cyan or magenta dye.

11. The method of claim 9, wherein said receiver sheet is passed under a cyan donor sheet and a magenta donor sheet.

12. The method of claim 11 wherein said receiver sheet is further passed under a yellow printhead and then passed under a printhead to transfer a protective layer from a donor sheet to said receiver sheet bearing the full color image.

13. The method of claim 12 wherein said dye comprises a combination of the two yellow dyes:

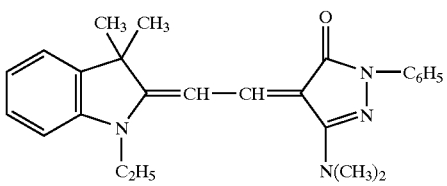

(yellow)

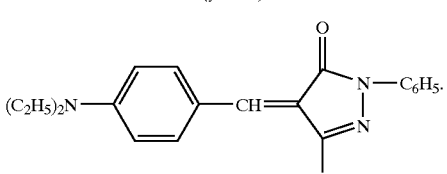

(yellow)

14. The method of claim 9 wherein said base comprises polyethyleneterephthalate.

15. The method of claim 14 wherein said yellow dye layer has a coverage of between 0.05 to about 1 g/m².

16. The method of claim 9 wherein said yellow dye layer has a glass transition temperature of between 25 and 40° C.

\* \* \* \* \*